United States Patent [19]

Gotoh et al.

[11] 4,178,969

[45] Dec. 18, 1979

[54] SYSTEM AND METHOD FOR CONTROLLING THE STOPPING OPERATIONS OF WEAVING MACHINES

[75] Inventors: Miyuki Gotoh, Tokorozawa; Mikiyoshi Ogawa, Yokohama, both of Japan

[73] Assignee: Nissan Motor Company, Limited, Japan

[21] Appl. No.: 936,191

[22] Filed: Aug. 24, 1978

[30] Foreign Application Priority Data

Sep. 5, 1977 [JP] Japan ............................. 52-105876

[51] Int. Cl.$^2$ ............................................. D03D 51/00
[52] U.S. Cl. .................................... 139/1 R; 139/336; 66/157; 340/146.2
[58] Field of Search .................. 139/1 R, 336 R, 349, 139/370.1; 340/146.2; 235/92 AC; 66/157, 163

[56] References Cited

U.S. PATENT DOCUMENTS

| | | |
|---|---|---|
| 3,340,537 | 9/1967 | Long et al. ............................. 139/1 R |
| 3,570,550 | 3/1971 | Budzyna et al. ...................... 139/1 R |
| 3,634,769 | 1/1972 | Sleater et al. ........................ 340/146.2 |
| 3,905,211 | 9/1975 | Raisin et al. ............................. 66/157 |
| 3,955,177 | 5/1976 | Miller .................................. 340/146.2 |
| 3,983,329 | 9/1976 | Rock ................................... 340/146.2 |

*Primary Examiner*—Henry Jaudon
*Attorney, Agent, or Firm*—Robert E. Burns; Emmanuel J. Lobato; Bruce L. Adams

[57] ABSTRACT

A system for controlling the stopping sequence of a plurality of weaving machines under emergency conditions and a method for the same are disclosed. The system includes a preference control circuit which upon receipt of high and low priority emergency signals from detectors activates a brake actuator to stop the associated weaving machine under the emergency condition of high priority which calls for immediate action, while introducing a delay to the corrective action to be taken in respect of the weaving machine under the emergency condition of low priority not requiring immediate action.

7 Claims, 7 Drawing Figures

SYSTEM AND METHOD FOR CONTROLLING THE STOPPING OPERATIONS OF WEAVING MACHINES

BACKGROUND OF THE INVENTION

The present invention relates generally to weaving machines, and in particular to system and method for controlling the sequence of stopping a plurality of weaving machines to minize the loss of time due to inevitable stoppages.

Owing to modern technological advances, the number of failures that occur in weaving machines has drastically reduced so that the number of maintenance personnels for a given number of machines has decreased. However, there are still some routine jobs done by the maintenance person which involves periodic stoppages of the machine to cut off the woven fabric to replace the cloth roller whenever the fabric has reached a predetermined length or supply a fresh roll of warp yarn whenever a predetermined amount of supply has been spent. It is the usual practice to operate the machines such that there is no overlapping between such routine jobs so as to minimize the outage times. In addition to the routine stoppage of the machine, the machine has to be stopped sometimes for fixing troubles such as failures in picking, warp yarn cutoff, and selvage yarn cutoff, although such failures have descreased in number. Since such stoppage actions occur at unpredictable times, particularly in respect of the actions caused by failures, routine stoppage actions are still likely to occur simultaneously with a failure stoppage action, and the number of such simultaneous occurrences tends to increase with the increase in the number of weaving machines to be controlled. From the standpoint of efficiency of machine operation and the number of maintenance personnels available, it is of course undesirable to allow the machines to stop simultaneously.

Weaving machine failures can be classified into a first group of failures which call for immediate action and a second group of failures which do not necessarily require such immediate action. Cutoffs in warp or selvage yarn belong to the first group of failures because a delay in the corrective action would result in an irrecoverable fault, while the failures in the second group includes failures in picking operation which does not necessarily call for immediate corrective action so long as such failure does not repeat itself within a short period of time. On the other hand, the routine-type stoppage actions can be deferred if a certain period of allowance is provided.

SUMMARY OF THE INVENTION

The primary object of the present invention is to minimize the loss of time due to inevitable stoppage actions in respect of weaving machines by deferring routine stoppage actions to a permissible extent as necessary to avoid the simultaneous occurrence with a stoppage action caused by failures.

The control system according to the invention comprises a preference control unit which administers the stopping operations of a plurality of weaving machines by processing emergency signals received from each machine characterizing the level of priority or imminency of the emergency situation. The emergency conditions are classified into a high priority emergency calling for immediate corrective action and a low priority emergency in respect of which the corrective action can be deferred to a permissible extent. The signal signifying the high priority conditions is allowed to activate the brake actuator regardless of the presence of any other emergency signals, while the low priority emergency signal is allowed to instantly activate the brake actuator only in the absence of a high priority emergency signal from any other weaving machines. The low priority signal is delayed for a predetermined period of time when it occurs in the presence of a high priority emergency condition. If the high priority emergency is removed during the delayed period, the low priority signal is instantly allowed to activate the associated brake actuator.

BRIEF DESCRIPTION OF THE DRAWINGS

The invention will be further described in connection with the accompanying drawings, in which:

FIG. 2, comprised of FIG. 2A and FIG. 2B, is a block diagram of a first embodiment of the invention;

FIG. 3, comprised of FIG. 3A and FIG. 3B, is a block diagram of a modified embodiment of the invention; and FIG. 4, comprised of FIG. 4A and FIG. 4B, is a block diagram of another modified embodiment of the invention.

DETAILED DESCRIPTION

Figure 1:
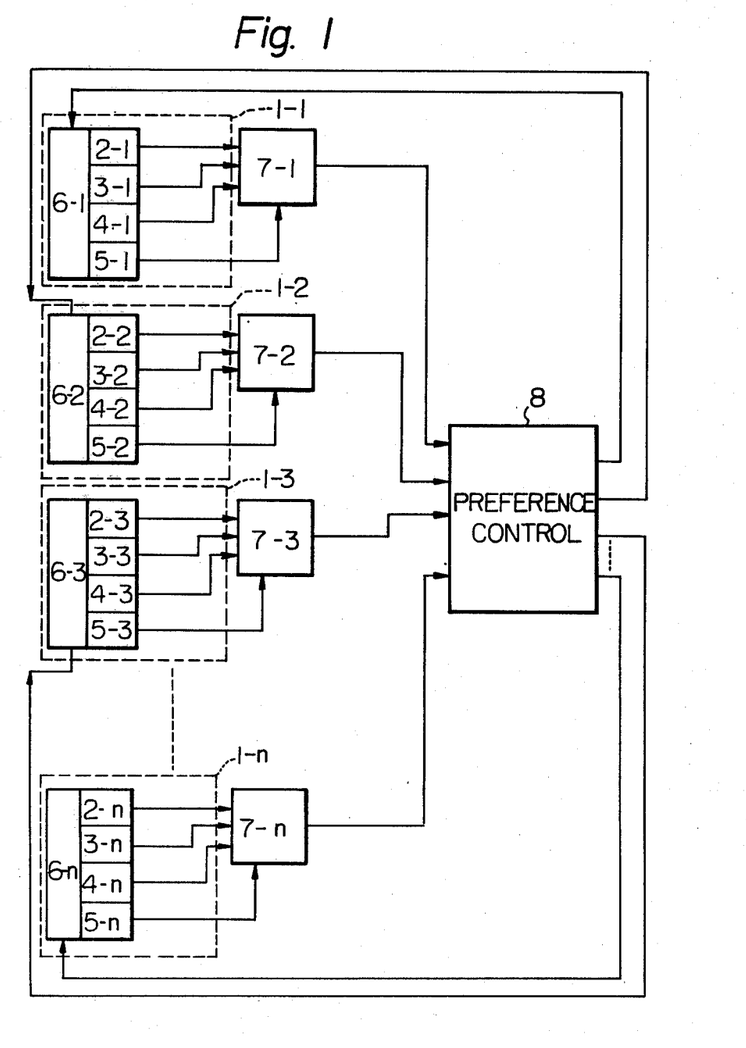
FIG. 1 is an illustration of the general functional blocks of the invention.

In FIG. 1 the weaving machine stopping control system of the invention is illustrated as comprising a set of weft yarn detector 2, warp cutoff detector 3, selvage cutoff detector 4 and woven-length detector 5, and a brake actuator 6 for each one of a plurality of weaving machines 1-1, 1-2 to 1-n. The subscripts attached to the numerals are used to identify different weaving machines throughout the drawings.

Because of the nature of the failures, the output from each of the detectors 3 and 4 can be regarded as a high priority emergency signal which calls for immediate action to be taken by the maintenance personnel. The output from the woven-length detector 5 is on the other hand regarded as a low priority emergency signal because the corrective action can be delayed for a permissible length of time if it occurs in the presence of a high priority emergency condition. The output from the weft yarn detector 2 can be regarded as having an intermediate level priority between the high and low priorities since only the repetitive occurrences within a set period of time is regarded as requiring immediate action.

The outputs from each set of detectors 2 to 5 are supplied to a storage circuit 7 which stores the emergency information in respect of the associated weaving machine. The signals applied to the storage circuit 7 are stored therein and at the same time delivered through respective output leads to a preference control circuit 8, the stored signals being cleared by a reset signal supplied thereto when emergency condition is removed. The preference control circuit 8 processes the input emergency signal of different priority levels in accordance with a predetermined logic and delivers stopping signals to respective brake actuators 6. The aforesaid detectors may be any of the well known design. For example, the weft yarn detector 2 may be the one as described in U.S. Pat. No. 3,678,969 assigned to the same assignee as the present invention, in which a pressure detector attached to a warp detects the presence of the weft by sensing the tension of the attached warp at the time of beating operation. The warp detector is described in Japanese Utility Model Application No. Sho 51-127437, and the selvage detector is described in Japanese Patent Application No. Sho 42-18586. The woven-length detector 5 may comprise a pulse generator which generates an electrical pulse in response to each revolution of the cloth roller and a counter which in receipt of the generated pulses provides an output upon count of a predetermined number of the received pulses.

Figure 2A:
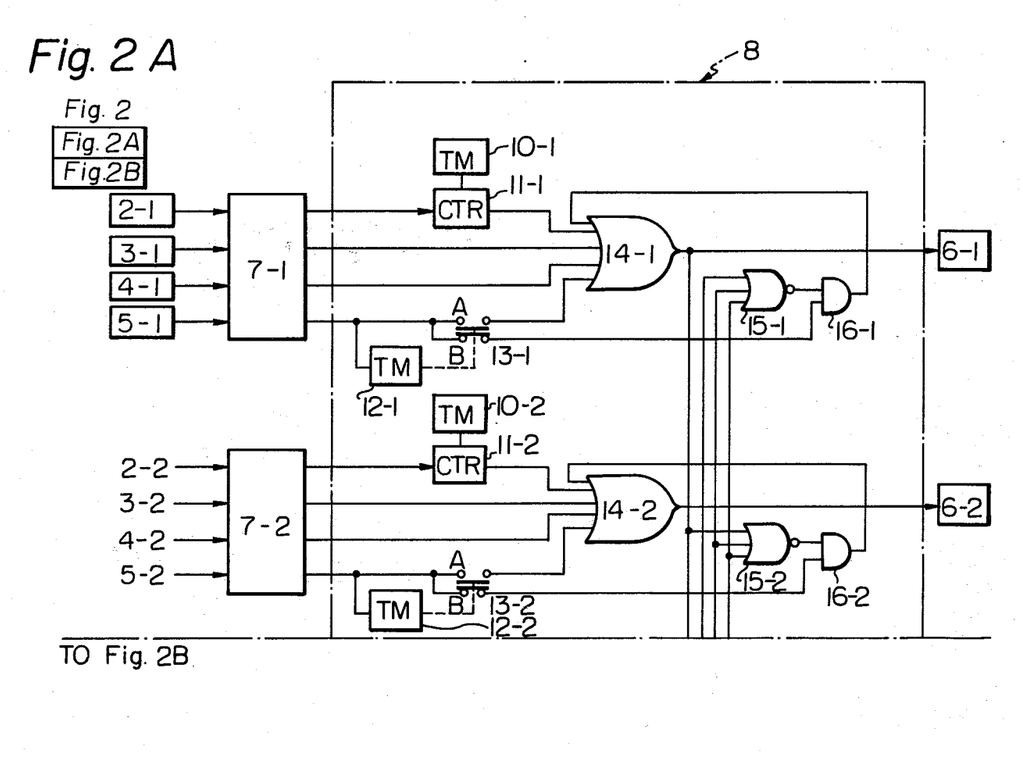
Figure 2B:
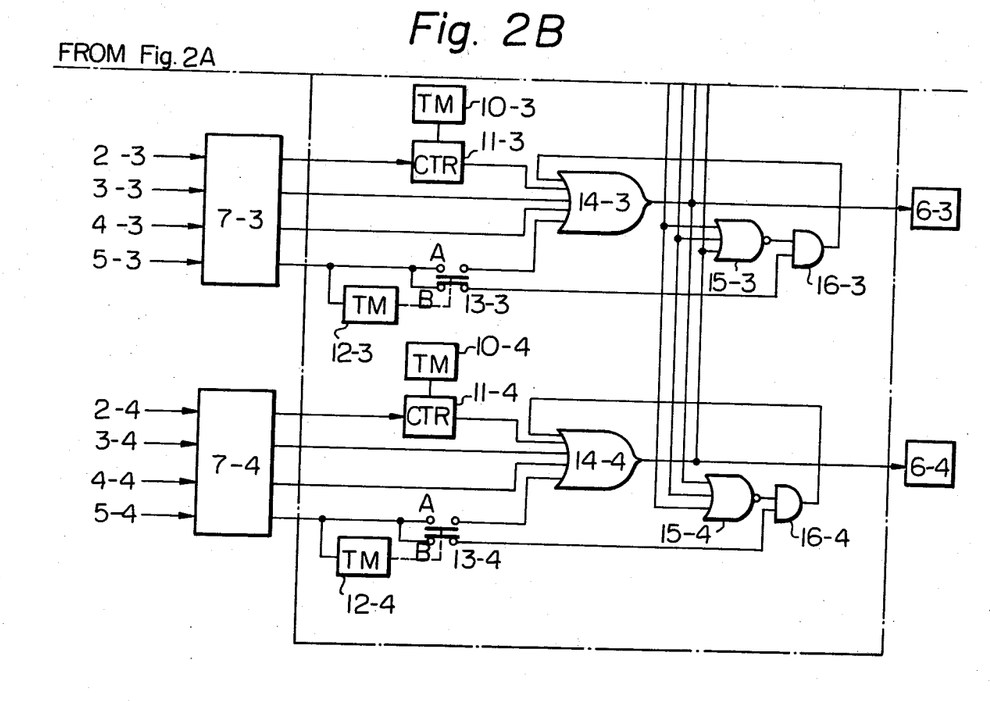

FIG. 2 illustrates the details of the preference control circuit 8 of FIG. 1. For the sake of simplicity, the description will proceed with only four weaving machines although in actual practice the preference circuit 8 controls approximately a hundred weaving machines.

Although weft yarn failures may in some cases represent a high priority emergency, most of the signals from the weft yarn failure detector 2 can be regarded as a low priority emergency signal. However, if such low emergency weft yarn failures have occurred within a present time interval, it represents a high priority failure. For this purpose a timer 10 is provided which is activated to start timing action in response to an output from detector 2 via counter 11 which is connected to the output lead of the storage circuit 7 associated with the weft yarn failure detector 2. The counter 11 generates a high priority emergency signal only when a predetermined number of weft yarn failure have occurred within a time period set by the timer 10. The signal from each counter 11 is applied through an OR gate 14 to the associated brake actuator 6. High priority emergency signals from the warp yarn detector 3 and selvage yarn detector 4 are also connected through OR gate 14 to the associated brake actuator 6. A timing circuit 12 is connected to the woven-length detector 5 to initiate timing action in response to an output from the wove-length detector 5 via storage circuit 7. When a delay period has elapsed, the timing circuit activates a switch 13 to close its normally open A position contacts and open its normally closed B position contacts. The signal through the A position contacts of switch 13 is connected via OR gate 14 to the brake actuator 6 and the signal through the B position contacts is applied to an input of a respective one of AND gates 16-1 through 16-4.

The output terminal of the OR gate 14-1 is also connected to an input terminal of NOR gates 15-2, 15-3 and 15-4, the output of OR gate 14-2 being connected to an input of NOR gates 15-1, 15-3 and 15-4. Similarly, the output of OR gate 14-3 is connected to an input of NOR gates 15-1, 15-2 and 15-4, the output of OR gate 14-4 being connected to an input of NOR gates 15-1, 15-2 and 15-3.

The output of each NOR gate 15 is connected to the other input of a respective one of AND gates 16-1 to 16-4, the output of each AND gate 16 being connected via the respective OR gate 14 to the associated brake actuator 6.

The operation of the circuit of FIG. 2 is as follows. Assume that a cutoff failure has occurred in a warp yarn of the first weaving machine 1-1, a high priority emergency signal will be delivered from the detector 3-1 to the storage circuit 7-1 and thence through OR gate 14-1 to brake actuator 6-1 so that the associated weaving machine is instantly stopped. Simultaneously, a high logic level signal is applied to NOR gates 15-2, 15-3 and 15-4 to switch their output conditions to a low logic level, which disables AND gates 16-2, 16-3 and 16-4.

Under these conditions, a low priority emergency signal from any one of the woven-length detectors 5-2, 5-3 and 5-4 is inhibited from activating the associated brake actuator. Because the highest priority is given to cutoff troubles in warp and selvage yarns, the signals from the detectors 3-2, 3-3, 3-4 and 4-2, 4-3, 4-4 are, of course, allowed to activate the associated brake actuators even when the weaving machine 1-1 is put out of operation. After the failure in weaving machine 1-1 has been removed, a restart switch (not shown) is manually operated, which clears the failure information stored in the circuit 7-1.

If, during the stoppage of the weaving machine 1-1, the woven-length detector 5-2 of the machine 1-2 has delivered an output, this signal will then be stored in memory circuit 7-2 and in response thereto the timing circuit 12-2 will start timing operation. If, under these circumstances, the weaving machine 1-1 is restarted within the period of the timing operation of circuit 12-2, the output of OR gate 14-1 goes low and consequently the output of NOR gate 15-2 goes high to activate the brake actuator 6-2. If the delay period has elapsed before the weaving machine 1-1 is restarted, switch 13-2 will be operated by the timing circuit 12-2 to close its A contacts and open its B contacts, so that the signal from the woven-length detector 5-2 is coupled through contacts A of switch 13-2 and through OR gate 14-2 to the brake actuator 6-2. Therefore, the weaving loom 1-2 is stopped as soon as the machine 1-1 is restarted within the timing period of timer 12-2, and if machine 1-1 is not restarted within that period, machine 1-2 is forcibly stopped at the end of the timing period.

If, during the stoppage of machine 1-1, the woven-length detector 5-3 should deliver an output signal in the presence of the signal from the detector 5-2, the machine 1-3 is, of course, prevented from being stopped. If, the machine 1-1 is restarted during the timing period of the timer 12-3, it is desirable to activate one of the brake actuators 6-2 and 6-3 upon restart of the weaving machine 1-1. However, the outputs of the NOR gates 15-2 and 15-3 are both at low logic level due to the receipt of a high voltage signal from OR gate 14-3 and OR gate 14-2, respectively. Thus, AND gates 16-2 and 16-3 are both disabled so that brake actuators 6-2 and 6-3 remain deenergized until one of the timing circuits 12-2 and 12-3 reaches the end of the timing period earlier than the other.

Although this stopping operation in the simultaneous presence of signals from more than one woven-length detector may introduce a certain length of delay, it is of no practical problem if the number of weaving machine to be supervised under a single personnel is relatively small because of a small probability with which such situation occurs. However, if a greater number of machines is to be controlled, it is desirable to eliminate the delay time during simultaneous occurrences of signals from more than one woven-length detector.

Figure 3A:
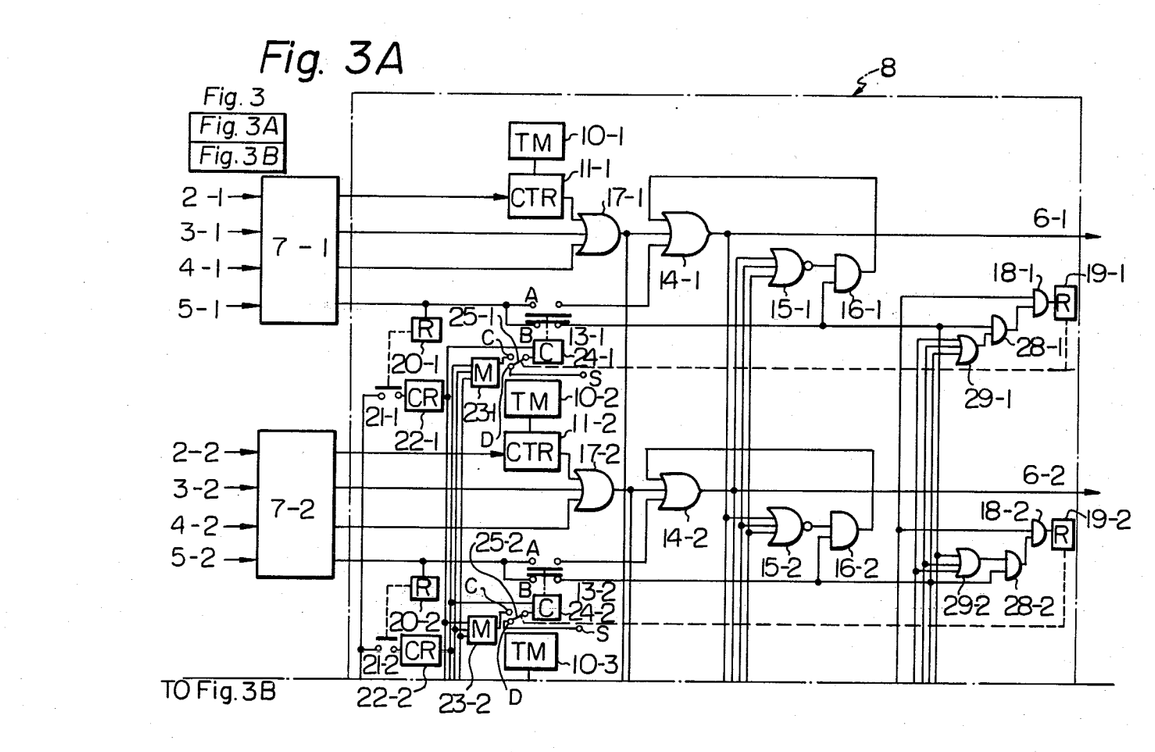
Figure 3B:
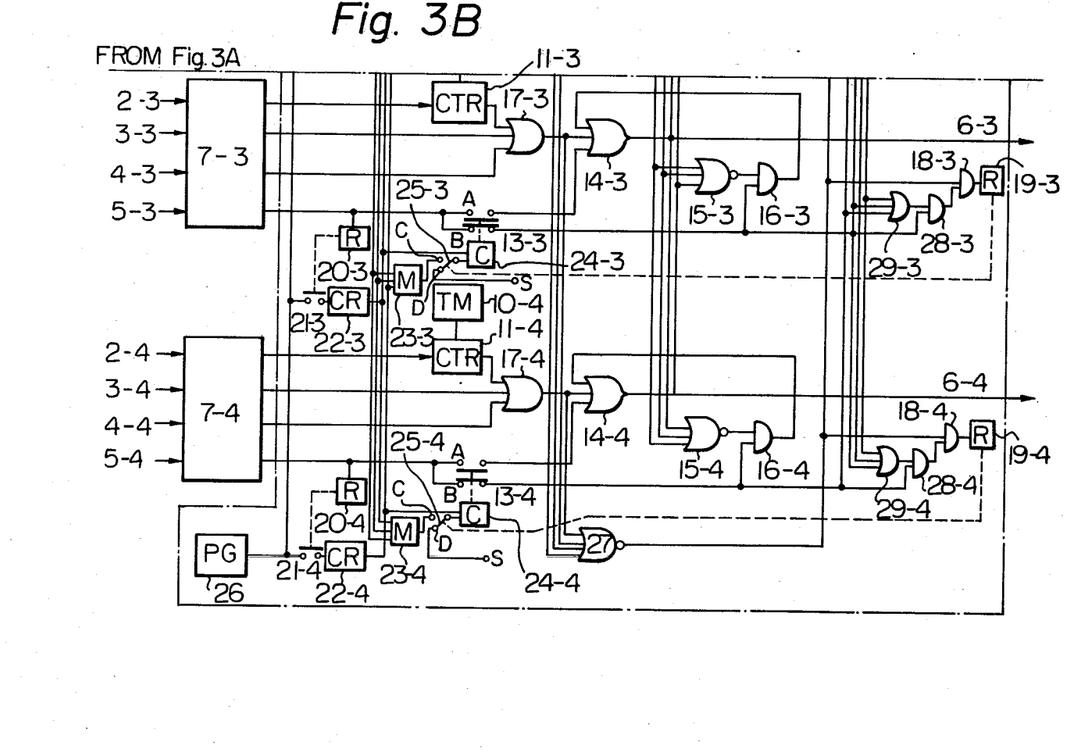

FIG. 3 shows another control circuit which is adapted to solve the aforesaid disadvantage. In FIG. 3, there is provided a pulse generator 26 which supplies clock pulses to pulse counters 22-1 through 22-4 via switch contacts 21-1 to 21-4, respectively. The switch contacts 21 are operated respectively by timing relays 20-1 to 20-4 connected to be responsive to the respective outputs of woven-length detectors 5 via respective storage circuits 7. The output of each counter 22 is applied to an input of a respective one of comparators 24-1 to 24-4. Maximum value detectors 23-1, 23-2, 23-3 and 23-4 are connected to receive output signals from the counters 22 which are associated with the other weaving looms, that is, the detector 23-1 receives outputs from counters 22-2, 22-3 and 22-4, the detector 23-2 receiving outputs from counters 22-1, 22-3 and 22-4, and so on. Each of the maximum value detectors determines which one of the associated counters 22 has a greater count number than any of the others and applies the detected count in analog value to the associated comparator 24. The second input terminal of each comparator 24 is normally connected to the D position of relay contacts 25 and thence to a reference voltage terminal S, and switches to the C position to receive the output of maximum detector 23 in response to energization of relay 19.

A NOR gate 27 is provided to deliver a disable signal to AND gates 18-1 to 18-4 whenever any one of the OR gates 17 is in the high output state. An AND gate 28 is provided for each weaving machine to place a high voltage signal to AND gate 18 when the associated woven-length detector 5 produces an output in the presence of a high level signal from a respective one of OR gates 29-1 to 29-4 which are connected to respond to signal from the woven-length detectors of the other weaving machines. Therefore, each AND gate 18 provides a high voltage signal to energize the associated relay 19 in the simultaneous presence of signals from woven-length detectors 5 provided that there is no signal from failure detectors 2, 3 and 4.

Assuming that a warp yarn detector 3-1 has generated a signal resulting in a high voltage at the output of OR gate 17-1 and OR gate 14-1 to energize brake actuator 6-1. All of the AND gates 18 are disabled. NOR gates 15-2, 15-3 and 15-4 are switched to the low output state so that brake actuators 6-2, 6-3 and 6-4 are inhibited in the same manner as previously described.

Under these conditions, if the woven-length detector 5-2 is assumed to have generated an output, this output will be inhibited by the disabled AND gate 16-2, but operates the relay 20-2 to close switch 21-2 to apply clock pulses from pulse generator 26 to counter 22-2 and thence in analog form to comparator 24-2. Since relay 19-2 remains deenergized, comparator 24-2 compares the signal from counter 22-2 with a reference voltage from terminal S. When the reference voltage is reached after the elapse of predetermined interval from the generation of output from woven-length detector 5-2, the comparator 24-2 generates an output which energizes switch 13-2 to close its contacts A and open its contacts B, thereby activating brake actuator 6-2.

Assume that woven-length detector 5-2 and the detector 5-3 have generated outputs in succession while the weaving machine 1-1 remains inoperative, relays 20-2 and 20-3 are operated to apply clock pulses to counters 22-2 and 22-3 so that comparators 24-2 and 24-3 compare the respective counter outputs with the reference voltage. If the first weaving machine 1-1 is restarted before either of the comparators 24-2 and 24-3 produces its output signal, the memory circuit 7-1 is cleared by a manually operated circuit (not shown) resulting in a low voltage output from OR gate 17-1 and then an enable signal from NOR gate 27 to AND gates 18. Since OR gates 29-2 and 29-3 are in the high output state, AND gates 28-2 and 28-3 are also in the high output conditions. Therefore, relays 19-2 and 19-3 are operated to switch the relay contacts 25-2 and 25-3 from the D to C positions in order to couple the outputs of maximum detectors 23-2 and 23-3 to the comparators 24-2 and 24-3, respectively. It will be appreciated that the count stored in counter 22-2 is greater than that stored in counter 22-3, the maximum value in detector 23-3 is greater than the maximum value in detector 23-2 so that comparator 24-2 instantly generates its output. The output from the comparator 24-2 operates the switch 13-2 to couple the output from detector 5-2, now stored in memory 7-2, to OR gate 14-2 and thence to brake actuator 6-2. As soon as the weaving machine 1-2 becomes inoperative, the memory circuit 7-2 is cleared by a circuit (not shown) to cause OR gate 29-3 and therefore AND gates 28-3 and 18-3 to switch to a low output state, resulting in deenergization of relay 19-3 so that the reference voltage is again supplied to comparator 24-3 for comparison with the output of counter 22-3. Thus, brake actuator 6-3 is activated after the elapse of a predetermined period from the delivery of the signal from woven-length detector 5-3. It will be understood that when there are more than a low priority signal from woven-length detector 5 in the presence of a high priority emergency in another weaving machine, the restarting of this machine causes the one of the woven-length detectors which has delivered its signal earlier than the others to activate its associated brake actuator, while the other woven-length detectors are not allowed to activate their brake actuators until a predetermined time has elapsed.

Figure 4A:
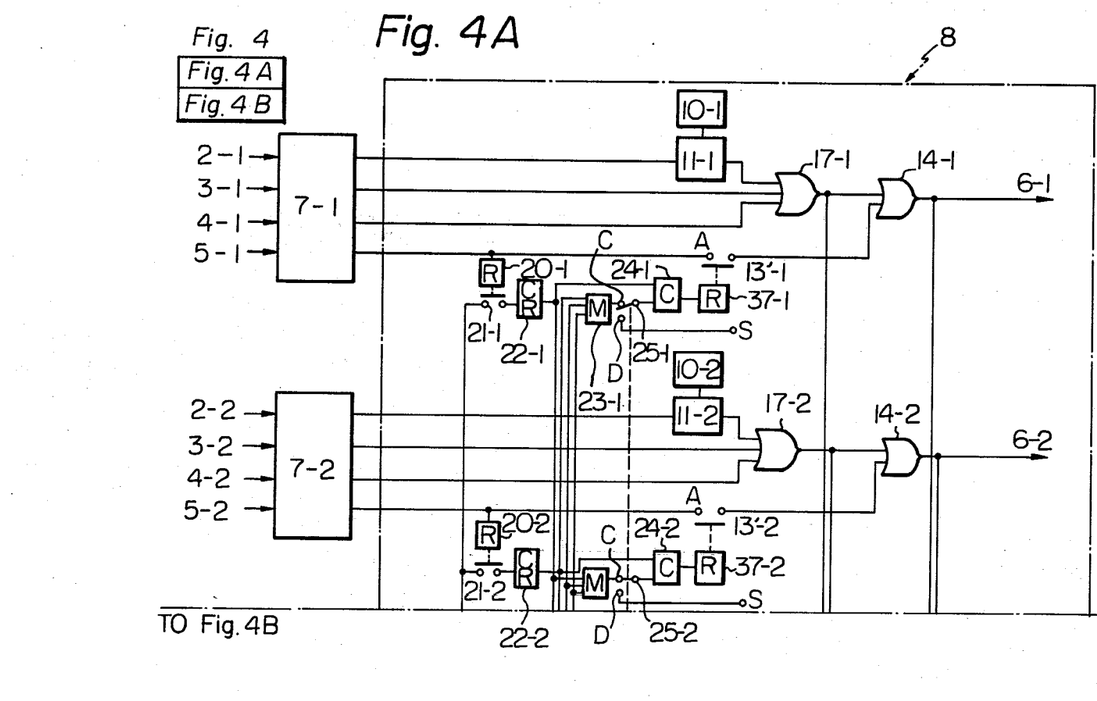
Figure 4B:
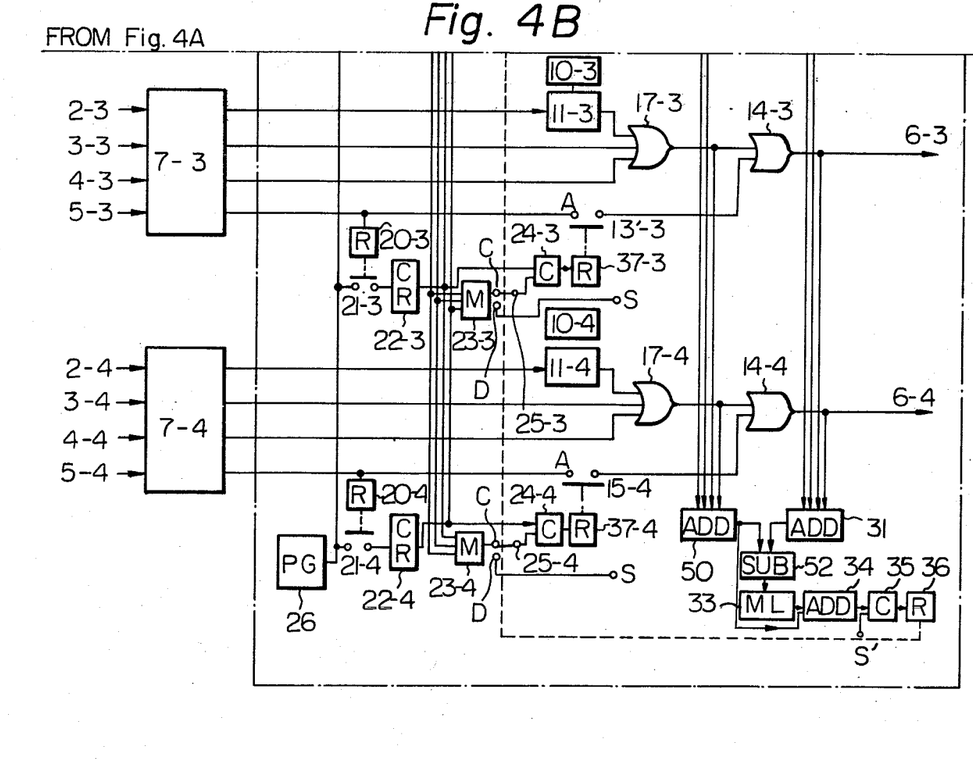

FIG. 4 is a modification of the embodiment of FIG. 3 in which the corresponding parts are indicated by the corresponding numerals used in FIG. 3. The circuit of FIG. 4 differs from the FIG. 3 embodiment in that the logic circuit including NOR gates 15, AND gates 16, 18, 28 and OR gates 29, and relays 19 are replaced with a circuit which includes adders 30, 31 and 34, subtractor 32, a multiplier 33, a comparator 35 and a relay 36 having its own contacts 25 interposed between maximum detectors 23 and comparators 24. The embodiment of FIG. 4 is particularly suitable for applications where the number of weaving looms which are rendered inoperative is to be equal to or smaller than the number of maintenance personnels to minimize the loss of time due to incapability for attention to inoperative machines.

The adder 30 receives its input signals from the outputs of OR gates 17-1 to 17-4 to count the number of machines rendered inoperative due to failures requiring immediate maintenance attention, and adder 31 receives its input signals from the outputs of OR gates 14-1 to 14-4 to count the number of all the inoperative machines. The subtractor 32 provides a difference signal representing the number of machines rendered inoperative due to the routine job and feeds its signal to multiplier 33 which amplifies the difference signal by a predetermined multiplication factor. This multiplication factor represents the number of maintenance personnels required for a routine job in respect of a single weaving machine. For example, if two persons are needed for such a routine job as interchanging crossbeams, the multiplication factor is two. The amplified signal is supplied to adder 34 for summation with the output of adder 30. The comparator 35 compares the summation output with a reference value S' which represents the maximum number of maintenance personnels for the machines under the control of a single unit of the control circuit 8. Comparator 35 generates a high voltage signal whenever the summation output is equal in magnitude to or greater than the reference value S' to energize the relay 36.

The operation of the embodiment of FIG. 4 is as follows. Assume that the number of maintenance personnels for the machines under the control of a single unit of the circuit 8 is three. This means that in case of a high priority emergency a maximum of three looms can be attended to and in case of a low priority emergency only one machine can be attended to so that if there are two machines under low priority emergencies, one of which should not be stopped until the other is resumed operation.

Assuming that the weaving loom 1-1 has been rendered inoperative due to a high priority emergency, the adders 30 and 31 deliver a "1" output to subtractor 32 which cancels out both input signals so that no output is applied to the multiplier 33, resulting in a "1" output from adder 34, which output is compared in comparator 35 with the reference value S' which in this case "two". Since the output of adder 34 is smaller in magnitude than the reference value, the comparator 35 generates no output and the relay 36 thus remains deenergized leaving the relay contacts 25 in the C positions. However, there is no stored count in each of the counters 22-1 to 22-4, the comparators 24-1 to 24-4 deliver no output so that contacts 13'-1 to 13'-4 remain in the open position. Under these circumstances, if the woven-length detector 5-2 has assumed to have delivered an output, which energizes relay 20-2 to close switch contacts 21-2 feeding the clock pulses to the counter 22-2, whereupon this counter delivers "1" output. Since the output of maximum detector 23-2 is at zero level, the comparator 24-2 provides an output to energize relay 37-2, thereby closing the contacts 13'-2 to couple the output from the woven-length detector 5-2 to the brake actuator 6-2 via OR gate 14-2.

The stoppage of weaving loom 1-2 updates the contents of adder 31 from "1" to "2" so that subtractor 32 provides a "1" output to the multiplier 33 which amplifies it by a factor of "2", resulting in a "3" output from adder 34 which value is compared with the reference value of "2". The comparator 35 thus activates the relay 36 to switch the contacts 25-1 through 25-4 from the C to D positions. If, under these conditions, the weaving machine 1-3 is assumed to have delivered a low priority signal from its woven-length detector 5-3, the comparator 24-3 delivers no output until the reference value from terminal S is reached in the counter 22-3.

Although the present invention was described in connection with wired logic circuitry, it is obvious to those skilled in the art to employ stored program logic to practice the invention using a microcomputer in which the order of priorities can be easily changed by modification of the stored program.

What is claimed is:

1. A system for controlling the sequence of stopping operations of a plurality of weaving machines during emergency conditions to minimize the loss of time due to the stoppage, comprising:
    first and second detectors associated with each one of said weaving machines for generating high and low priority emergency signals respectively when the associated weaving machine is under an emergency condition of high or low priority; and
    preference controlling means for activating a brake actuator of the associated weaving machine in response to the presence of said high priority emergency signal and to the presence of said low priority emergency signal in the absence of high priority emergency signal generated from the detector associated with another weaving machine and activating said brake actuator after the elapse of a predetermined period of time in response to said low priority emergency signal in the presence of said another high priority emergency signal.

2. A system as claimed in claim 1, wherein said preference controlling means comprises a logic gate means associated with said first and second detectors for permitting the passage of the high priority emergency signal to the brake actuator of the associated weaving machine and timing means associated with the second detector for permitting the passage of the low priority emergency signal to said brake actuator after the elapse of a predetermined time period from the time of occurrence of the last-mentioned signal in the presence of another high priority emergency signal generated from the first detector associated with another weaving machine.

3. A system as claimed in claim 1 or 2, wherein said preference controlling means comprises:
    a pulse generator for generating clock pulses;
    a timing means responsive to said low priority emergency signal for generating an output after the elapse of a predetermined time period;
    a counter means for each one of said weaving machines for counting a train of clock pulses in response to the output of said timing means;
    a maximum detecting means associated with each one of said weaving machines for detecting the maximum value of the counts respectively stored in the counter means associated with the other weaving machines;
    a comparator means; and
    a logic circuit means for providing one of first and second logic states depending upon the presence of another high priority emergency signal and the presence of another low priority emergency signal to cause said comparator means to compare said count stored in said counter means with a predetermined value in response to said first logic state and cause said comparator means to compare said stored count with the detected maximum value in response to said second logic state; and
    a switching means responsive to an output from said comparator means to activate said associated brake actuator.

4. A system as claimed in claim 3, wherein said logic circuit comprises means associated with each one of said weaving machines to respond to the presence of a high priority emergency signal and to the absence of any other low priority emergency signal to generate a first signal representing said first logic state and respond to the absence of a high priority emergency signal which occurs simultaneously with the presence of any other low priority emergency signal to generate a signal representing said second logic state.

5. A system as claimed in claim 3, wherein said logic circuit means comprises:
    means for detecting the number of said low priority emergency signals generated from the second detectors associated with all of said weaving machines;
    means for multiplying said detected number of the low priority emergency signals by a predetermined multiplication factor which represents the number of maintenance personnels required for attending to a single weaving machine under the low priority emergency condition;

means for providing summation of said multipled number and the number of the high priority emergency signals generated from the first detectors associated with all of said weaving machines; and second comparator means for comparing the summation output with a reference value representing the maximum number of maintenance personnels to generate a first signal representing said first logic state when said summation output is greater than said reference value and a second signal representing said second logic state when said summation output is smaller than said reference value.

6. A system as claimed in claim 1 or 2, further comprising a third detector associated with each one of said weaving machines for generating an emergency signal of a priority level intermediate the levels of said high and low priorities, and means for counting the number of occurrences of said intermediate priority level signal within a predetermined period of time to activate the brake actuator of the associated weaving machine when said counted number reaches a predetermined value.

7. A method for controlling the sequence of stopping operations of a plurality of weaving machines during emergency conditions to minimize the loss of time due to the stoppage, comprising:

providing first and second detectors associated with each one said weaving machines to generate a high and low priority emergency signals respectively when the associated weaving machine is under high or low priority emergency condition;

detecting whether there is any high priority emergency signal other than the high priority signal generated from said first detector;

activating a brake actuator of the associated weaving machine in response to said high priority emergency signal;

activating said brake actuator in response to said low priority emergency signal when there is no other high priority signal detected;

introducing a delay time in response to said low priority emergency signal when there is any other high priority signal detected; and activating said brake actuator after the elapse of said delay time.

* * * * *